(12) United States Patent
Ghaly

(10) Patent No.: US 9,286,947 B1
(45) Date of Patent: Mar. 15, 2016

(54) METHOD AND SYSTEM FOR PRESERVING DATA OF A STORAGE DEVICE

(71) Applicant: SEAGATE TECHNOLOGY LLC, Cupertino, CA (US)

(72) Inventor: Mai Ghaly, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/508,098

(22) Filed: Oct. 7, 2014

(51) Int. Cl.
*G11B 27/36* (2006.01)
(52) U.S. Cl.
CPC ..................................... *G11B 27/36* (2013.01)
(58) Field of Classification Search
None
See application file for complete search history.

(56) References Cited

U.S. PATENT DOCUMENTS

| | | | |
|---|---|---|---|
| 5,611,024 A | 3/1997 | Campbell et al. | |
| 6,850,443 B2 | 2/2005 | Lofgren et al. | |
| 7,345,837 B1* | 3/2008 | Schreck et al. | 360/31 |
| 7,477,465 B2 | 1/2009 | Yu | |
| 7,567,400 B2 | 7/2009 | Cheng | |
| 7,738,208 B2 | 6/2010 | Kim et al. | |
| 7,747,907 B2 | 6/2010 | Olds | |
| 7,859,784 B2* | 12/2010 | Ogawa | 360/53 |
| 8,014,097 B1* | 9/2011 | Sanvido | 360/60 |
| 8,023,215 B1 | 9/2011 | Ghaly | |
| 8,301,830 B2 | 10/2012 | Feldman et al. | |
| 8,312,204 B2 | 11/2012 | Zhang | |
| 8,325,434 B2 | 12/2012 | Namkoong | |
| 8,578,089 B2 | 11/2013 | Watts | |
| 8,736,994 B2 | 5/2014 | Sugawara | |
| 2005/0180267 A1 | 8/2005 | Jeong et al. | |
| 2008/0174905 A1 | 7/2008 | Ueda | |
| 2009/0154000 A1 | 6/2009 | Kojima | |
| 2009/0237842 A1 | 9/2009 | Ehrlich | |
| 2010/0271727 A1 | 10/2010 | Namkoong et al. | |
| 2011/0161557 A1 | 6/2011 | Haines | |
| 2013/0028061 A1 | 1/2013 | Rosen et al. | |
| 2013/0117520 A1 | 5/2013 | Ryu | |
| 2014/0075110 A1* | 3/2014 | Benhase et al. | 711/114 |
| 2015/0113201 A1 | 4/2015 | Kong et al. | |

OTHER PUBLICATIONS

U.S. Appl. No. 14/057,152, filed Oct. 18, 2013, Kong et al.

* cited by examiner

*Primary Examiner* — K. Wong
(74) *Attorney, Agent, or Firm* — Mueting, Raasch & Gebhardt, P.A.

(57) ABSTRACT

Various embodiments of a method and system for preserving data of a data storage device are disclosed. The method can include determining a number of times data is written to a target track of a storage medium; rewriting data from a track adjacent the target track if the number of times data is written to the target track exceeds a first predetermined threshold; determining a number of times data is rewritten to the adjacent track; copying data from the target track to a first storage location of a media cache if the number of times data is rewritten to the adjacent track exceeds a second predetermined threshold; writing subsequent data designated for the target track to the first storage location of the media cache; and relocating data from the first storage location of the media cache to the target track.

20 Claims, 3 Drawing Sheets

METHOD AND SYSTEM FOR PRESERVING DATA OF A STORAGE DEVICE

SUMMARY

In general, the present disclosure relates to various embodiments of a method and system for preserving data of a data storage device, which, in some embodiments, can minimize data loss due to adjacent track erase (ATE) phenomenon.

In one aspect, the present disclosure provides a method that includes determining a number of times data is written to a target track of a storage medium; rewriting data from a track adjacent the target track if the number of times data is written to the target track exceeds a first predetermined threshold; and determining a number of times data is rewritten to the adjacent track. The method further includes copying data from the target track to a first storage location of a media cache if the number of times data is rewritten to the adjacent track exceeds a second predetermined threshold; writing subsequent data designated for the target track to the first storage location of the media cache; and relocating data from the first storage location of the media cache to the target track if subsequent data designated for the target track has not been written to the first storage location of the media cache for a time T that is greater than a time threshold.

In another aspect, the present disclosure provides a system that includes a storage medium including a target track and an adjacent track to the target track, and a controller. The controller can be configured to determine a number of times data is written to the target track of the storage medium; rewrite data from the adjacent track if a number of times data is written to the target track exceeds a first predetermined threshold; and determine a number of times data is rewritten to the adjacent track. The controller can also be configured to copy data from the target track to a first storage location of a media cache if the number of times data is rewritten to the adjacent track exceeds a second predetermined threshold; write subsequent data designated for the target track to the first storage location of the media cache; and relocate data from the first storage location of the media cache to the target track if subsequent data designated for the target track has not been written to the first storage location of the media cache for a time period T that is greater than a time threshold.

In another aspect, the present disclosure provides a controller containing controller-executable instructions that, when executed by the controller operably connected to a storage device, cause the controller to: determine a number of times data is written to a target track of the storage device; rewrite data from an adjacent track to the target track if a number of times data is written to the target track exceeds a first predetermined threshold; determine a number of times data is rewritten to the adjacent track; copy data from the target track to a first storage location of a media cache if the number of times data is rewritten to the adjacent track exceeds a second predetermined threshold; write subsequent data designated for the target track to the first storage location of the media cache; relocate data from the first storage location of the media cache to the target track if subsequent data designated for the target track has not been written to the first storage location of the media cache for a time period T that is greater than a time threshold; and rewrite data to a second adjacent track to the target track if a number of times data is written to the target track exceeds a third predetermined threshold, the target track positioned between the adjacent track and the second adjacent track.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure relates to various embodiments of a method and system for preserving data of a data storage device, which, in some embodiments, can minimize data loss due to adjacent track erase (ATE) phenomenon.

The capacity of data storage devices continues to increase. For example, some embodiments of data storage systems utilize magnetic fields to selectively change the magnetic state of magnetic storage media. One technique for increasing the capacity of these types of data storage systems is to increase the number of tracks per inch (TPI) on the magnetic storage media. The TPI is representative of the track density of a system.

In one or more embodiments, a write element portion of a magnetic head is used to produce a magnetic field that can write data to these tracks of the magnetic media. As is further described herein, the magnetic field from the write element portion can be incident upon not only a target track but also tracks that are adjacent to the target track (i.e., adjacent tracks). As the TPI or density of the magnetic media increases, the likelihood that adjacent tracks are affected by the magnetic fields from the write element portion also increases. This overlap of the magnetic field onto adjacent tracks can weaken or even erase the data signal from these tracks, i.e., adjacent track erase (ATE) can occur. In other words, this ATE phenomenon can occur if data is repetitively written in one position (i.e., to a target track) because the magnetic field used to write data to the target track can affect tracks adjacent to the target track, thereby potentially damaging or erasing the data written to the adjacent tracks.

One or more embodiments of the present disclosure can reduce or eliminate the ATE phenomenon by monitoring the number of times data is written to a target track, and then rewriting data from one or more tracks that are adjacent to the target track (i.e., adjacent tracks) if the number of times data is written to the target track exceeds a first predetermined threshold. Further, in one or more embodiments, the number of times data is rewritten to these adjacent tracks can be monitored, and data from the target track can be relocated to a media cache if the number of times data is rewritten to one or more adjacent tracks exceeds a second predetermined threshold.

Figure 1:
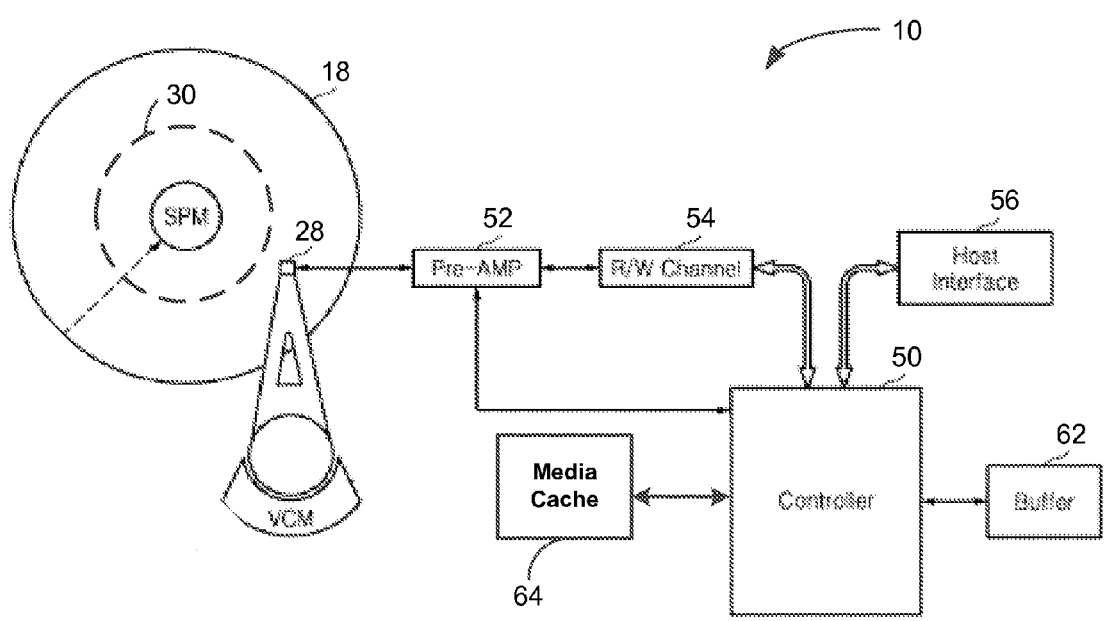
FIG. 1 is a schematic block diagram of one embodiment of a data storage system.

The various embodiments of a method and system of the present disclosure can be used with any suitable data storage systems. For example, FIG. 1 is a schematic plan view of one embodiment of a data storage system 10. The system 10 includes data storage medium 18. Medium 18 can be divided into data tracks, such as track 30, and a head 28 is positioned adjacent the data tracks to read data from and store or write data to a respective track. The tracks 30 can be provided with head position control information written to embedded servo sectors. Data sectors, which can be embedded between servo sectors, can be used for storing data in the form of bit patterns.

The head 28 can include a read element portion and a write element portion. The write element portion writes input data to the track 30 during write operations of the device 10, and the read element portion reads output data from the tracks. This output data can be previously stored data that is being recalled for use in processing, or the data can be servo data used to control the positioning of the head 28 relative to a desired track 30. In one or more embodiments, medium 18 can be dedicated to providing servo information for one or more other heads 28.

The system 10 can include any suitable control circuitry. For example, system 10 includes a driving circuit that includes a controller 50 that controls a pre-amplifier (Pre-AMP) 52, a read/write channel (R/W channel) 54, a host interface 56, a buffer 62, media cache 64, etc. The pre-amplifier 52 amplifies a data signal read from the medium 18 by the magnetic head 28, or amplifies a writing electric current converted by the read/write channel 54 to be written on the medium through the magnetic head. The read/write channel 54 converts the signal amplified by the pre-amplifier 52 into a digital signal to be transmitted to a host device (not shown) through the host interface 56, or converts data input by a user and received through the host interface into a binary data stream to be input to the pre-amplifier. The host interface 56 transmits a digital signal converted based on data to the host device, or receives user input data from the host device and transmits it to the read/write channel 54 via the controller 50. Here, the host device refers to elements such as a central processing unit (CPU), an input/output (I/O) controller 50, or the like of a computer that generally controls and operates the whole computer system involving the system 10. The buffer 62 temporarily stores data transmitted between the host interface 56 and the controller 50. Generally, the buffer 62 can include any suitable memory storage, e.g., dynamic random access memory (DRAM) or nonvolatile memory, e.g., flash memory.

The controller 50 receives data input by a user through the host device through the host interface 56 and outputs it to the read/write channel 54 in a data writing mode, and receives a digital signal converted based on a read signal by the read/write channel and outputs it to the host interface 58 in a data reading mode. In one or more embodiments, controller 50 preserves data by rewriting and/or relocating the data that is written in a zone or region where the ATE phenomenon is likely to occur as is further described herein. The controller 50 can include any suitable devices or circuitry, e.g., microcontrollers, etc. In one or more embodiments, the controller 50 can be in the form of software or firmware.

The media cache 64 is configured to temporarily store data that may later be written to the storage media 18. As used herein, media cache is physical space on the storage medium 18 or one or more non-volatile data storage media that can cache data. The media cache 64 can include any suitable type of memory. In one or more embodiments, the media cache 64 is located on the storage medium 18. In one or more embodiments, the media cache 64 is located on non-volatile data storage media or memory. Any suitable non-volatile memory can be utilized to store media cache 64, e.g., RRAM, STRAM, flash, etc.

Figure 2:
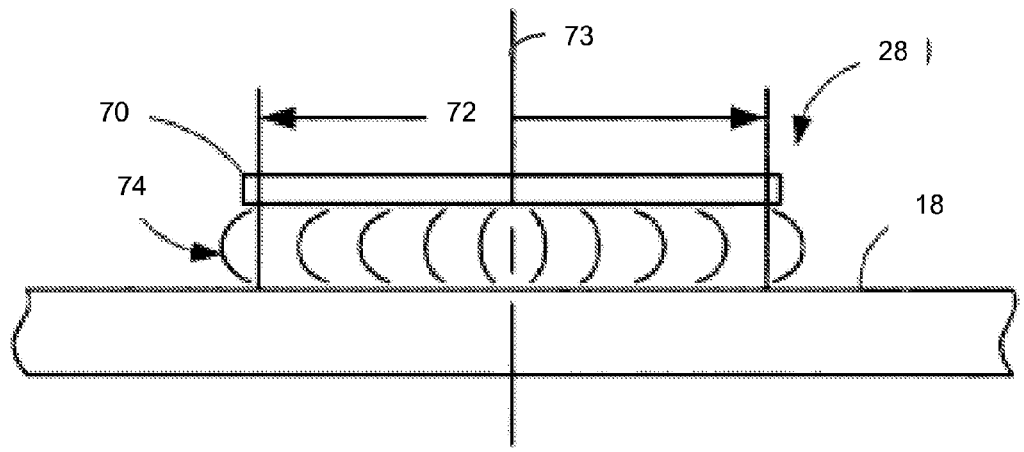
FIG. 2 is a schematic cross-section view of one embodiment of a write element portion of the head and the magnetic medium of the system of FIG. 1.
Figure 3:
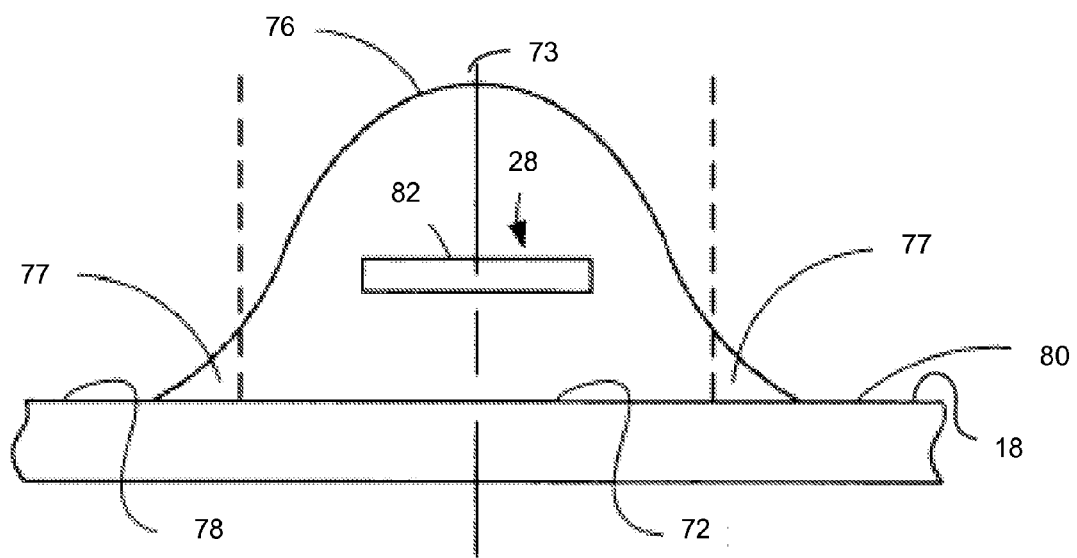
FIG. 3 is a schematic cross-section view of one embodiment of a read element portion of the head and the magnetic medium of the system of FIG. 1.

As mentioned herein, the ATE phenomenon can occur when a writing operation is repeatedly performed on a target track. Because the magnetic write field can overlap tracks adjacent the target track during these write operations, the data in these adjacent tracks can be unintentionally weakened or erased. For example, FIG. 2 is a schematic cross-section view of one embodiment of a write element portion 70 of the head 28 in a data storing relationship with the medium 18 of the system 10 illustrated in FIG. 1. And FIG. 3 is a schematic cross-section view of a read element portion 82 of the head 28 in a data reading relationship with the magnetic medium 18. The head 28 is positioned relative to a centerline 73 of track 72. The write element portion 70 is selectively energized to produce a magnetic flux field 74 that stores input data, such as by imparting magnetic transitions in the medium 18. Typically, the fringe effects of the flux field 74 are wider than the width of the track 72 as illustrated by a flux density profile 76 illustrated in FIG. 3. It has been observed that under certain conditions an advantageously robust flux field 74 can be imparted to a particular location of track 72 with negligible effects of tail portions 77 of the flux density profile 76 that are imparted to adjacent tracks 78 and 80. In one or more embodiments, the fringe effects have been negligible in part because of the flux strength with which data in the adjacent tracks 78, 80 are stored, in part because of the relatively minimal extent to which the tail portions 77 encroach upon the adjacent tracks, and in part because the read element portion 82 of the head 28 is typically narrower than the write element portion 70. Because of the latter, with sufficient tracking precision of the head 28 the read element portion 82 is capable of reading a centrally disposed portion of the entirety of the stored data.

However, as track density increases, the width of track 72 decreases, thereby potentially making it more challenging for the read element portion 82 to only read track 72. Further, repeated writes to the same portion of the medium 18, such as to a particular sector, or to a particular track or a band of tracks, can affect the integrity of the data that is stored in adjacent tracks 78, 80. As used herein, the term "writes" refers to the writing of data to a particular track or region of a magnetic storage medium. Further, these kinds of repeated writings are typical of activities commonly associated with the continual updating of stored information. These adverse effects can be exacerbated by off-track budgeting that permits the storing and retrieving of data with the head 28 being disposed in a somewhat nonaligned relationship with the centerline 73 of track 72.

The ability of the storage medium to reliably "hold" a stored direction of magnetization is related to a material property of the grains of magnetic material known as anisotropy energy. As areal density has increased, the grain size has correspondingly decreased to maintain the requisite number of grains for adequate thermal stability. However, the anisotropy energy of each grain is proportional to its size, so the relatively smaller grains are more susceptible to thermal decay (superparamagnetic effect). It has been observed that the flux fringe effects from a large number of repeated writes to a particular track produces adverse cumulative effects on the adjacent tracks.

Figure 4:
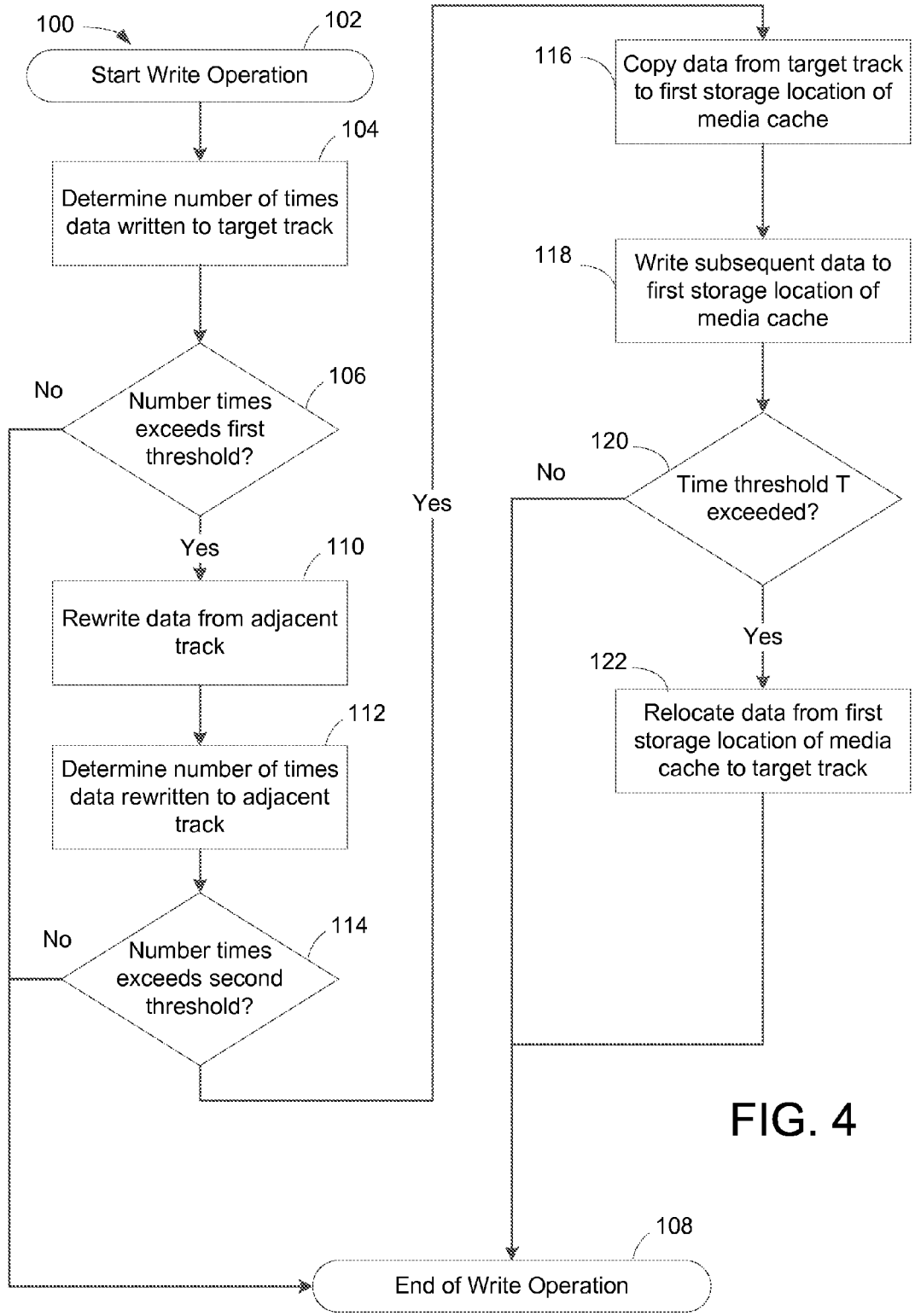
FIG. 4 is a flow diagram of one embodiment of a method of preserving data.

The present disclosure provides various embodiments of a method and system that can address this signal degradation of tracks that are adjacent target tracks, thereby reducing the ATE phenomenon. For example, FIG. 4 is a flow diagram of one embodiment of a method 100 for preserving data. The method 100, which is described in reference to the storage system 10 of FIG. 1, can be implemented using any suitable devices or circuitry, e.g., controller 50 of FIG. 1.

A write command is given to commence a write operation 102. A number of times data is written to a target track 104 of a storage medium (e.g., storage medium 18) is determined using any suitable technique. For example, in one or more embodiments, controller 50 can search a lookup table where the number of writes to a logical block address (LBA) of the target track is recorded when receiving the write command.

Here, LBA means a series of sector and/or track numbers allocated to the respective sectors and tracks of the magnetic medium, e.g., medium 18 of FIG. 1 (e.g., sequentially allocated by giving "0" to the first sector) in logical block addressing as one technique for assigning the sector address of the disk, in which one LBA assigns one sector on the disk.

In one or more embodiments, when a write command is input to controller 50 and a write operation starts, the lookup table where the number of writes performed to a specific LBA is recorded and can be searched at 104.

The lookup table can be stored, e.g., in a maintenance cylinder of the magnetic medium 18 and uploaded to a buffer (e.g., buffer 62 of FIG. 1) when the system 10 is powered on. That is, in one or more embodiments, the lookup table can be uploaded from the media 18 to the buffer and then searched.

In one or more embodiments, if the lookup table has no LBA for assigning the target track for the writing in response to the write command as a result of searching the lookup table, an LBA for assigning the target track can be added to the lookup table. At this time, the number of writes for the newly added LBA is initialized with "1." Alternatively, in one or more embodiments, all LBAs may be previously stored in the lookup table.

If the number of times data has been written to the target track 104 exceeds a first predetermined threshold 106 (i.e., a first threshold amount), then data from a track adjacent the target track (i.e., an adjacent track) is rewritten 110. Any suitable technique can be utilized to rewrite data from the adjacent track 110. For example, in one or more embodiments, data from the adjacent track can be copied to buffer 62 and then rewritten back to the adjacent track. This first predetermined threshold 106 can be any suitable number of writes. In one or more embodiments, the first predetermined threshold 106 can be at least 5 times, at least 10 times, at least 100 times, at least 1000 times, at least 10,000 times, etc. In one or more alternative embodiments, the first predetermined threshold 106 can be no more than 100,000 times. In one or more embodiments, the first predetermined threshold 106 can be determined by estimating the number of writes to the target track that may cause data in adjacent tracks to be degraded or lost because of the ATE phenomenon. Further, this first predetermined threshold 106 can vary depending upon one or more factors, e.g., environmental conditions that the system 10 is subjected to, the composition of the magnetic storage medium 18, the strength of the write field, etc.

If the number of times data is written to the target track 104 does not exceed the first predetermined threshold 106, then, in one or more embodiments, the number of writes for this track is increased by one in the lookup table. If the lookup table is being read from the buffer 62, then the lookup table stored in the maintenance cylinder can be updated with the lookup table uploaded to the buffer when the storage device 10 enters an idle time mode or is powered off, for example.

Further, if this first predetermined threshold is not exceeded, then the write operation ends at 108.

If, on the other hand, the number of times data is written to the target track 104 exceeds the first predetermined threshold 106 and data is rewritten to the adjacent track 110 of the medium, then the number of times this data has been rewritten to the adjacent track 112 is determined. Any suitable techniques may be utilized to make this determination. For example, in one or more embodiments, this determination can be performed by searching a lookup table where the number of rewrites to an LBA of the adjacent track is recorded when the write command is received.

If the number of times data is rewritten to the adjacent track 112 exceeds a second predetermined threshold 114 (i.e., a second threshold amount), then data from the target track can be copied to a first storage location of a media cache 116 (i.e. media cache 64 of FIG. 1). As mentioned herein, the media cache can be a physical location that is located in any suitable position in the system. For example, in one or more embodiments, the media cache is located on a storage medium (e.g., storage medium 18 of FIG. 1). In one or more embodiments, the media cache can be located on non-volatile memory. Further, in one or more embodiments, the media cache can be located in both the storage medium and non-volatile memory. The first storage location of the media cache becomes in essence a mirror image of the target track. In one or more embodiments, after the data from the target track is copied to the first storage location of the media cache, the LBA of the target track can be rearranged with an LBA of the first storage location of the media cache by interchanging the LBA of the target track with an LBA of the first storage location of the media cache.

The second predetermined threshold 114 for the number of times data is rewritten to the adjacent track can be any suitable number of writes. In one or more embodiments, this second predetermined threshold is at least 5 times, at least 10 times, at least 100 times, at least 1000 times, at least 10,000 times, etc. In one or more embodiments, this threshold 114 can be no more than 100,000 times. This second predetermined threshold 114 can, in one or more embodiments, be determined by estimating the number of times data can be rewritten to the adjacent track before the integrity of this data is compromised. Such estimation can be affected by several factors, including environmental conditions that the system 10 is subjected to, the composition of the medium 18, and the strength of the magnetic write field, etc.

After data from the target track has been copied to the first storage location of the media cache 116, subsequent data that is designated for the target track can also be written to the media cache 118. In other words, any data designated for the target track can instead be stored in the media cache. In one or more embodiments, the subsequent data can be written to the same location that the data from the target track was copied to, e.g., the first storage location. In one or more embodiments, the subsequent data can instead be written to a second storage location of the media cache. Any suitable technique or combination of techniques can be utilized to write subsequent data designated for the target track to the first storage location of the media cache. For example, an address of the data that is copied from the target track to the first storage location of the media cache can be reassigned before writing data designated for the target track to the first storage location of the media cache.

In one or more embodiments, after the data from the target track has been relocated, additional data can be prevented from being written to the target track. Any suitable technique can be utilized to block this track from subsequent write operations. For example, the LBA for the target track can be removed from the lookup table.

If the number of times data is rewritten to the adjacent track 112 does not exceed the second predetermined threshold 114, then the writing operation ends at 108. In one or more embodiments, prior to, during, or after ending the write operation at 108, the number of times data has been rewritten to the adjacent track is increased by one in the lookup table.

In one or more embodiments, if subsequent data designated for the target track 118 has not been written to the first storage location of the media cache for a time T that is greater than a time threshold 120, then data from the first storage location of the media cache 116 can be relocated to the target track. In other words, if the target track remains inactive for a desired period of time, then data from the first storage location of the media cache 116 can be relocated to the target track.

By writing subsequent data to the media cache 116 instead of the storage medium, the effect of ATE phenomenon on one or more adjacent tracks to the target track can be mitigated. The data designated for the target track that is stored in the first storage location of the media cache can be relocated to the target track, thereby in effect writing data to the target track much less frequently than if the data designated for the target track was directly written to the target track. The frequency of writing data to the target track is, therefore, lowered, reducing the influence the track imposes on the adjacent tracks. This copying of data to the media cache can also lower the frequency of performing adjacent track refreshes or rewrites.

If, however, the time T between designations of subsequent data for the target track is less than the time threshold 120, then the data from the first storage location of the media cache is not relocated to the target track. For example, if data is designated to be written to the target track at a first time T1 and then additional subsequent data is designated to be written to the target track at a second time T2, and the time between T1 and T2 is less than the time threshold, then data is not relocated to the target track.

The time threshold can be any suitable period of time. For example, in one or more embodiments, the time threshold can be at least 10 minutes, at least 20 minutes, at least 30 minutes, at least 1 hour, at least 12 hours, at least 24 hours, etc. In one or more embodiments, the time threshold can be no greater than 100 days, 50 days, 10 days, 5 days. In one or more embodiments, the time threshold can be determined by estimating the number of writes to the target track that may cause data in adjacent tracks to be degraded or lost because of the ATE phenomenon. Further, this time threshold can vary depending upon one or more factors, e.g., environmental conditions that the system 10 is subjected to, the composition of the magnetic storage medium 18, the strength of the write field, etc.

Following relocation of data from the first storage location of the media cache to the target track at 122, the first storage location of the media cache can be erased and no longer mirror the target track, and the write operation ends 108.

Although the method 100 describes one adjacent track to the target track, any suitable number of tracks adjacent the target track can be rewritten according to the techniques described herein. For example, in one or more embodiments, a second track adjacent the target track (i.e., the second adjacent track) can be positioned such that the target track is between the adjacent track and the second adjacent track. Data from this second adjacent track can be rewritten if the number of times data is written to the target track exceeds a third predetermined threshold (i.e., a third threshold amount). The third predetermined threshold can be the same as or different from the first predetermined threshold for rewriting data to the adjacent track.

The techniques described herein can be utilized with any suitable storage device or system. For example, in reference to FIG. 1, such system can include a storage medium 18 that includes a target track and an adjacent track to the target track (i.e., the adjacent track). The apparatus can also include a controller 50. In general, the controller 50 can include or contain controller-executable instructions that, when executed by the controller operably connected to a storage device, can cause or configure the controller to perform any suitable function or task. For example, the controller 50 can be configured to determine a number of times data is written to the target track of the storage medium. The controller 50 can also be configured to rewrite data from the adjacent track if a number of times data is written to the target track exceeds a first predetermined threshold. Further, in one or more embodiments, the controller 50 can be configured to determine a number of times data is rewritten to the adjacent track and copy data from the target track to a first storage location of a media cache if the number of times data is rewritten to the adjacent track exceeds a second predetermined threshold.

In one or more embodiments, the controller 50 can also be configured to write subsequent data designated for the target track to the first storage location of the media cache, and relocate data from the first storage location of the media cache to the target track if subsequent data designated for the target track has not been written to the first storage location of the media cache for a time T that is greater than a time threshold.

In one or more embodiments, the controller 50 can also be configured to increase the number of times data is written to the target track by one when the number of times data is written to the target track does not exceed the first predetermined threshold. Further, in one or more embodiments, the controller 50 can also be configured to increase the number of times data is rewritten to the adjacent track by one when the number of times data is rewritten to the adjacent track does not exceed the second predetermined threshold.

In one or more embodiments, the controller 50 can also be configured to rewrite data from a second adjacent track to the first track (i.e., the second adjacent track) if the number of times data is written to the target track exceeds a third predetermined threshold.

In one or more embodiments, the controller 50 can also be configured to prevent additional data from being written to the target track after data from the target track has been copied to the first storage location of the media cache. Further, in one or more embodiments, the controller 50 can also be configured to reassign an address of the data that is copied from the target track to the first storage location of the media cache.

Further, in one or more embodiments, the controller 50 can also be configured to erase the first storage location of the media cache after data from the first storage location is relocated to the target track.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The preceding detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

What is claimed is:

1. A method comprising:
   determining a number of times data is written to a target track of a storage medium;
   rewriting data from a track adjacent the target track if the number of times data is written to the target track exceeds a first predetermined threshold;
   determining a number of times data is rewritten to the adjacent track;
   copying data from the target track to a first storage location of a media cache if the number of times data is rewritten to the adjacent track exceeds a second predetermined threshold;
   writing subsequent data designated for the target track to the first storage location of the media cache; and
   relocating data from the first storage location of the media cache to the target track if subsequent data designated for the target track has not been written to the first storage location of the media cache for a time T that is greater than a time threshold.

2. The method of claim 1, wherein the first predetermined threshold is at least 100 times.

3. The method of claim 1, wherein the second predetermined threshold is at least 100 times.

4. The method of claim 1, further comprising reassigning an address of the data that is copied from the target track to the first storage location of the media cache before writing subsequent data designated for the target track to the first storage location of the media cache.

5. The method of claim 1, wherein the time threshold equals 24 hours.

6. The method of claim 1, further comprising erasing the first storage location of the media cache after data from the first storage location of the media cache is relocated to the target track.

7. The method of claim 1, wherein the media cache is located on the storage medium.

8. The method of claim 1, wherein the media cache is located on non-volatile memory.

9. The method of claim 1, further comprising rewriting data from a second track adjacent the target track if the number of times data is written to the target track exceeds a third predetermined threshold, wherein the target track is positioned between the adjacent track and the second adjacent track.

10. A system comprising:
    a storage medium comprising a target track and an adjacent track to the target track; and
    a controller configured to:
       determine a number of times data is written to the target track of the storage medium;
       rewrite data from the adjacent track if a number of times data is written to the target track exceeds a first predetermined threshold;
       determine a number of times data is rewritten to the adjacent track;
       copy data from the target track to a first storage location of a media cache if the number of times data is rewritten to the adjacent track exceeds a second predetermined threshold;
       write subsequent data designated for the target track to the first storage location of the media cache; and
       relocate data from the first storage location of the media cache to the target track if subsequent data designated for the target track has not been written to the first storage location of the media cache for a time period T that is greater than a time threshold.

11. The system of claim 10, wherein the first predetermined threshold is at least 100 times.

12. The system of claim 10, wherein the second predetermined threshold is at least 100 times.

13. The system of claim 10, wherein the controller is further configured to reassign an address of the data that is copied from the target track to the first storage location of the media cache.

14. The system of claim 10, wherein the time threshold equals 24 hours.

15. The system of claim 10, wherein the controller is further configured to erase the first storage location of the media cache after data from the first storage location is relocated to the target track.

16. The system of claim 10, wherein the media cache is located on the storage medium.

17. The system of claim 10, further comprising non-volatile memory, wherein the media cache is located on the non-volatile memory.

18. The system of claim 10, wherein the controller is further configured to increase the number of times data is written to the target track by one when the number of times data is written to the target track does not exceed the first threshold amount.

19. A controller containing controller-executable instructions that, when executed by the controller operably connected to a storage device, cause the controller to:
    determine a number of times data is written to a target track of the storage device;
    rewrite data from an adjacent track to the target track if a number of times data is written to the target track exceeds a first predetermined threshold;
    determine a number of times data is rewritten to the adjacent track;
    copy data from the target track to a first storage location of a media cache if the number of times data is rewritten to the adjacent track exceeds a second predetermined threshold;

write subsequent data designated for the target track to the first storage location of the media cache;

relocate data from the first storage location of the media cache to the target track if subsequent data designated for the target track has not been written to the first storage location of the media cache for a time period T that is greater than a time threshold; and rewrite data to a second adjacent track to the target track if a number of times data is written to the target track exceeds a third predetermined threshold, the target track positioned between the adjacent track and the second adjacent track.

20. The controller of claim 19, wherein the third predetermined threshold equals the first predetermined threshold.

* * * * *